United States Patent [19]

Chandross et al.

[11] 3,808,443
[45] Apr. 30, 1974

[54] RADIATION DETECTOR AND PROCESS UTILIZING SAME

[75] Inventors: Edwin Arthur Chandross, Murray Hill; Warren Allen Salmon, Summit, both of N.J.

[73] Assignee: Bell Telephone Laboratories Incorporated, Murray Hill, Berkeley Heights, N.J.

[22] Filed: May 30, 1972

[21] Appl. No.: 257,705

[52] U.S. Cl. .............................................. 250/484
[51] Int. Cl. .............................................. G01t 1/20
[58] Field of Search .... 250/71 G, 71 T, 71 R, 43 R, 250/83 CD, 83 C, 472, 484

[56] References Cited
UNITED STATES PATENTS

| 3,440,420 | 4/1969 | Attik | 250/71 R X |
| R25,821 | 7/1965 | Shurcliff | 250/71 R |
| 2,937,279 | 5/1960 | Artandi et al. | 250/83 CD |
| 2,934,651 | 4/1960 | Etzel et al. | 250/71 R |

Primary Examiner—James W. Lawrence
Assistant Examiner—Davis L. Willis
Attorney, Agent, or Firm—G. S. Indig

[57] ABSTRACT

A photodimer, preferably derived from an anthracene derivative, serves as a radiation detector. Irradiation, e.g., electron radiation, brings about dissociation to the broken dimer (or monomer) state. The dissociated dimer fluoresces when illuminated by ultraviolet light. Included as a marking on PVC insulated wire destined for irradiation crosslinking, it serves as a production control.

16 Claims, 1 Drawing Figure

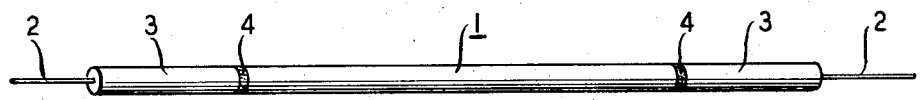

RADIATION DETECTOR AND PROCESS UTILIZING SAME

BACKGROUND OF THE INVENTION

1. Field of the Invention

The invention is concerned with radiation detectors or dosimeters as well as with their use as production controls in manufacturing procedures involving irradiation.

2. Description of the Prior Art

The increasing use of high energy radiation, e.g., electron beams, produced, for example, by accelerators or from radioactive isotope sources, has given rise to a development of radiation detectors. A common form of detector often worn by personnel subjected to radiation environments may utilize a silver salt emulsion similar to that used on photographic film. Other detectors utilize a variety of materials, for example, dyestuffs which are bleached to a colorless form, latent dyestuffs which, upon irradiation, assume a colored form, etc. Detectors may be essentially binary or they may be capable of quantitative measurement. The latter type is sometimes known as a dosimeter; see, for example, *Atomic Radiation and Polymers* by A. Charlesby, Pergamon Press, New York (1960), pp. 96–111.

Electron beam irradiation is attaining prominence as a procedural step in the fabrication of a variety of articles. A field of particular interest involves irradiation crosslinking of thermoplastic materials. Such irradiation crosslinking is commercially utilized in lieu of oven baking for the rapid curing of paint finishes. A use believed to be of prospective significance in the communications industry and possibly, more generally, in the fabrication of wire and cable, concerns the irradiation crosslinking of polyvinyl chloride (PVC) to produce a primary or secondary insulation which, while retaining many of the properties of the uncrosslinked polymer, is also endowed with the physical toughness and abrasion resistance of the cured product. The manufacture of PVC insulated telephone frame wire in which irradiation crosslinking is brought about by means of a difunctional monomer is now in an advanced stage of investigation.

Irradiation crosslinking, while affecting physical properties of the irradiated article, oftentimes has little or no effect on outward appearance. Specifically, considering crosslinked frame wire, it is a requirement that outward appearance, frequently including identification markings, show little or no change upon irradiation. It is apparent that a production line control could be useful in such fabrication. It may serve simply to indicate whether the article has been irradiated and/or to indicate the dosage level. A possible usage of such an indicator would be as a marking appearing at intervals on the article which is irradiated.

The common radiation detectors are not generally suitable for the above purpose. Silver emulsion-type detectors are extremely sensitive and their use is complicated by the general need of a wet chemical development. Dyestuffs, whether latent, so resulting in color center development on irradiation, or colored and rendered colorless by irradiation, could conceivably serve as such a production control but their use is complicated by the requirement that background color (of the article being fabricated) be such as to permit readily visual discrimination. It is unlikely that this desideratum can be satisfied for articles of the type described above which, by their nature, are likely to be of a variety of colors.

SUMMARY OF THE INVENTION

In accordance with the invention, any of a class of photodimers serve as radiation detectors. Exposure to radiation is established by the fluorescence produced by the irradiation-dissociated dimer when it is subjected to ultraviolet illumination.

It is the nature of photodimers that an excited state identical to or related to that of the photo-activated monomer (i.e., monomer or broken dimer) may result in fluorescence when exposed to short wavelength illumination (usually in the UV spectrum). A very large class of photodimers is presented and, since they are responsive to a variety of energy levels, members appropriate to a particular need may be selected. A particular class of photodimers, represented by dimers of anthracene derivatives, is considered preferred for many purposes by virtue of a number of considerations: the broken dimer generally fluoresces brightly when illuminated by a small, possibly hand-held UV lamp; both the dimer and broken dimer (or monomer) states are stable for long periods under most ambient conditions; and required dissociative energies are generally sufficiently high that the shortest wavelength UV encountered upon direct sunlight exposure is insufficient to result in formation of the dissociated species.

Detectors of the invention may serve as general purpose binary or analog indicators for relatively high energy levels (of the order of tens of KeV's to many MeV's). They may be absorbed from solution in a polymer film such as polyethylene which may be used, for example, to measure distribution in an electron beam. Dissolved in a binder, they may readily be caused to adhere to an article both before and after irradiation, thereby serving as a production control. An aspect of the invention involves a process in accordance with which such material is included as a detector marking on such an article.

BRIEF DESCRIPTION OF THE DRAWING

The FIGURE is a front elevational view of an exemplary structure provided with radiation detection markings in accordance with the invention.

DETAILED DESCRIPTION

1. The Drawing

The article 1 depicted in the FIGURE consists of one or more conductors 2 insulated with a single layer of insulation material 3. This layer 3, in an exemplary instance, consists of a polymeric material which is crosslinkable (or crosslinked) through a crosslinking agent under the influence of irradiation as by a particle beam or wave energy having energies (or equivalent energy) of the order of KeV's and greater. In this exemplary instance, the polymeric material is primarily or solely PVC and the crosslinking agent may be a difunctional or a trifunctional material such as tetraethylene glycol dimethacrylate. Markings 4 contain a photodimer (or broken photodimer—the "broken dimer" alludes to the dissociated monomer units while still substantially in the proximate positions occupied while chemically associated—the spectra may differ very slightly from those of the separated monomers but the difference is of no consequence from the standpoint of the invention) which, in its broken state, evidences a fluorescence characteristic of the broken state upon illumination by ultraviolet light. The FIGURE may be considered as depicting the structure prior to or subsequent to irradiation crosslinking.

2. General Considerations

There is a class of monomeric compositions which will undergo dimerization upon irradiation with electromagnetic radiation and which may then be caused to undergo dissociation under the influence of radiation of higher energy. A number of these compositions are characterized by physical and chemical stability over long periods of time under generally encountered ambient conditions in both the dimer and monomer states. In consequence, it has been proposed that materials of this class be used in switches and memory devices which are characterized by relatively low power requirements and extremely high information bit density.

Monomeric materials evidencing photodimerization dimerize in an excited electronic state resulting from irradiation by radiation within their absorption spectra. It is appropriate, therefore, to consider the dimerization formation as similar to or of the nature of an exciplex reaction. It is in no way surprising to find that the irradiated monomer may undergo a transition which competes with the dimerization process. This transition involving electronic relaxation, generally by liberation of one or more photons, evidences itself as fluorescence at a light wavelength longer than that of the peak of the exciting radiation. This competing transition is a significant drawback to use of the materials in switches or memories and, in such use, it is minimized by utilization of a single crystal or of a rigid matrix which assures sufficient proximity of the monomer to assure some formation of the dimer.

The reverse reaction, breaking of the dimer, requires a greater photon energy, i.e., electromagnetic radiation of shorter wavelength than that required for dimerization. Characteristically, the peak absorption spectrum of the dimer is separated from that of the monomer by many hundreds of angstrom units so that the reaction may easily be caused to proceed in one direction or the other preferentially. The dimer state, when excited by absorption of radiation, is characteristically not fluorescent. Were fluorescence to be observed, it could be brought about only by use of the higher energies required for dissociation and it would be expected to be of different wavelength from that of the monomer.

A characteristic of the photodimer system is a drastic change in size of the resonant electronic system of the molecule on going from one state (monomer) to the other (dimer). This results in a large space in between absorption bands for the monomer and dimer states and assures relatively complete reaction between states, so that the dimer state contains a minimal amount of monomer and vice versa. It is, therefore, observed that reaction of a single species monomer or dimer system is substantially complete at some threshold energy value and, therefore, that fluorescence characteristic of the monomer is not ordinarily observable in the dimer. This characteristic gives rise to an arrangement, in accordance with the invention, in which use is made of the inventive indicator as a "go—no go" indicator. Alternatively, systems may be chosen in which energy is required for complete reaction, generally from the dimer to monomer state are of the order of that involved in the procedural step being monitored so that the degree of reaction, in indicating different levels of fluorescence, permits the indicator to operate as a dosimeter. Another approach to operation as a dosimeter is the utilization of mixed systems involving two or more dimers requiring different energy levels for dosage of radiation to accomplish dissociation.

3. Operational Principle

In general, articles and procedures, in accordance with the invention, depend upon dissociation of a photodimer to produce a "broken dimer" or monomer. The effect of this transition is to produce a species which fluoresces, generally in the visible spectrum, under the influence of light of shorter wavelength than the fluorescence. In an exemplary species of the invention, such fluorescence is most expediently produced by use of near ultraviolet light. In general, the resulting fluorescence is bright and easily seen by the naked eye. Ordinarily, the required UV is in the near UV spectrum and energy is easily produced by a hand-held source. Use of illumination of appreciably shorter wavelength than required should be avoided since it may overlap the absorption peak of the dimer and itself cause breakdown.

Ordinarily, the radiation detector is dependent for its operation on a substantially completely reacted photodimer or mixture of photodimers. Such ingredient/s may, for practical reasons, be contained as a suspension or solution in a medium such as a hydrocarbon material. This hydrocarbon may take any of a number of forms; e.g., an adhesive as in the embodiment involving wire insulation marking; a self-supporting or supported film containing absorbed dimer, etc. In use, the dimer is exposed to irradiation so as to convert it to a state which fluoresces upon UV illumination. In an exemplary procedure where the dimer indicator is utilized as a production control or safety check to show that fabrication history included a radiation step, the indicator may be affixed directly to the article being fabricated prior to irradiation. Examples of such articles, e.g., polymeric insulating material and paint finishes, have been indicated.

Most photodimer species are dissociated only by irradiation dosage well in excess of that considered tolerable by humans. Most photodimers are, therefore, not suggested for substitution for the usual photographic emulsion type of indicator. On the other hand, photodimer indicators may be utilized as general indicators in high radiation environments for monitoring reactions, measuring radiation beam energy distribution, or in other scientific inquiry.

4. Composition a. The Indicator

The general nature of the class of indicator materials is well known. They are photodimers of aromatic monomers containing from one to six fused six-membered rings. A single ring is required to produce the photodimer and the maximum of six rings is premised on the observed reactivity of larger molecules (higher reactivity results in lessened chemical stability). Such materials may be pure hydrocarbons, such as alkylated anthracenes and higher homologs; may include a variety of substituents which may or may not be hydrocarbons; and may include elements other than carbon, e.g., nitrogen in the rings. The class includes, inter alia, various esters of anthroic acid and of higher acids within the class. Dimers of this class are observed to form complex ring structures in which bonding takes place between unfused paramembers of intermediate rings, for example, dimers of anthracene derivatives are generally bonded through the elements at the 9 and 10 positions. Examples of compounds falling within the preferred class, all, expressed in terms of the monomer, are set forth:

2-aminopyridine hydrochloride and closely related substances (e.g., with methyl groups)
anthracene
amyl-9-anthroate
methyl-1-anthroate
methoxy benzphenazine
tetracene
acridizinium p-toluenesulfonate Particularly for certain of the fused structures, dimerization may proceed with different carbon pairs; that is, while it is a requirement that the involved carbons be members of a single ring moiety, this and further requirements may be met by dimerization involving either a parapositioned pair of an end ring or the available unfused para-positioned carbons of any intermediate ring. Similarly, where substituent nature or other considerations are not such as to produce a strong reference for a particular pair of carbons, the resulting dimer may be asymmetrical, i.e., may involve bonding between dissimilar carbon pairs of each monomer unit.

A preferred class of photodimers for the inventive use is the dimers of anthracene derivatives. Such materials are not only cheaply produced and readily available, but they have a number of desirable characteristics for use as detectors. For example, photodimers of this class are not ordinarily absorbent of wavelengths of more than about 3200 angstrom units. Since this is the shortest wavelength encountered in any significant intensity in direct sunlight, dissociation is not brought about under any usually encountered condition of ambient lighting. Anthracenederivative photodimers are extremely stable and have lifetimes of many months or years, easily meeting requirements for most detector use, particularly where affixed to articles undergoing irradiation treatment. Monomers of this system are also extremely stable, again, with lifetimes at least of the order of many months, so that the radiation history of a concerned article may be determined at times considerably subsequent to processing. Fluorescence of the monomer is brought about by UV light within the wavelength range of from 3,200 to 3,800 angstrom units representing a photon energy well below that ordinarily encountered during processing of most articles. In common with other monomers utilized in accordance with the invention, activation resulting from UV pumping is nondestructive of the monomer. Dimerization occurs relatively slowly in many systems, and monomer separation ordinarily resulting in most matrices further minimizes the effect of this competing reaction.

Photodimers of the next higher homolog, i.e., tetracene derivatives, may also be quite useful, and situations may exist where their use would be preferred to that of anthracene derivatives. Such materials undergo dissociation with lower irradiation energy levels; and, so, they may be usefully employed either in admixture with other indicator materials or by themselves where such lower irradiation levels are of significance. A disadvantage of such materials, in addition to their comparative expense, is their increased reactivity. In general, such material absorbs at wavelengths above 3200 angstrom units and, accordingly, they are not stable when exposed to direct sunlight.

b. Supporting Medium

It is generally expeditious to contain the photodimer in dissolved or suspended form. This is particularly desirable where the detector material is directly affixed to an article to undergo irradiation processing. In general, the supporting medium is chosen to be transparent to the fluorescence. Other requirements are determined by the particular intended usage. For example, in monitoring the irradiation crosslinking of polymeric material, it is desirable to utilize a binder which is adherent to the polymer (e.g., polymethyl methacrylate). The binder may be a low molecular weight form of the same polymer (e.g., polyvinyl chloride) or may contain other polymeric material known to be adherent to the material undergoing treatment.

Under certain circumstances, it may be desirable to include a solvent material such as chlorinated hydrocarbon, acetone, toluene and tetrahydrofuran in addition to the binder. This may facilitate dispersion of the photodimer in the binder and/or may facilitate application of the composite dimer-photodimer to a substrate, e.g., a material to undergo irradiation processing.

Large films may be cast or, alternatively, solidified polymer may be impregnated with dimer by adsorption from solution.

c. Other Compositional Considerations

It is expected that the invention will find use in the monitoring of the irradiation crosslinking of PVC insulated wire. This type of insulation ordinarily contains a crosslinking medium. This medium, which may be contained in substantial amount, for example, 9 to 33 percent by weight based on the total insulation, usually contains a difunctional monomer of the type $CH_2C(CH_3)COO(CH_2)_xOCOC(CH_3)CH_2$ or $CH_2C(CH_3)COO(CH_2CH_2O)_yCOC(CH_3)CH_2$ in which $x$ is an average value of from 3 to 40 and $y$ is an average value of from 1.5 to 20. Desirably, at least 75 percent by weight of the crosslinking medium is made up of such monomer. The maximum limits in value of $x$ or $y$ (the two limits are equivalent since they specify the same number of carbon atoms) cannot be significantly exceeded since this results in a noticeable loss in abrasion resistance. The minimum limits in $x$ and $y$ are perhaps the greater consequence particularly in accordance with the preferred embodiment which avoids the use of a plasticizer. It is significant that a crosslinking monomer itself serves the function of plasticizing the compound sufficiently to permit expedient processing. While a fair degree of the plasticizer action is lost during irradiation, there is sufficient retention to impart the required flexibility for most wire and cable uses. This minimum limit in $x$ or $y$ is of consequence also where plasticizer is included since the amount of plasticizer required is reduced for the included class of crosslinking monomers. Elimination or minimization of plasticizer may be beneficial in several ways. Addition of increasing amounts of such ingredient dilutes otherwise excellent polymer properties and results in reduction of abrasion resistance, of fire retardance and of heat resistance. Other difficulties associated particularly with monomeric plasticizers which may be avoided include lacquer-lifting, bleeding, temperature instability (particularly on aging), etc.

What is claimed is:

1. Article of fabrication including a polymeric composition, said article having a functional configuration, desired properties of which are developed by a procedure including irradiation to bring about a change in the nature of the said composition, irradiation being carried out on the article having the said configuration, characterized in that said article includes, as an integral part thereof, at least one radiation detector consisting essentially of a photodimer which undergoes at least partial dissociation upon being exposed to the said irradiation and in which the dissociated state of the said photodimer is fluorescent upon illumination by short wavelength electromagnetic radiation.

2. Article of claim 1 in which the said radiation detector includes a binder medium, said binder enhancing adhesion to the said article.

3. Article of claim 2 in which the said binder medium includes a polymeric material.

4. Article of claim 3 in which the said polymeric material is chemically similar to that of the said polymeric composition.

5. Article of claim 2 in which the said detector is applied to the said article in the form of a solution in a solvent.

6. Article of claim 1 in which the said properties are developed through crosslinking of the polymeric composition.

7. Article of claim 6 in which the polymeric composition is an insulation layer on an electrically conducting wire.

8. Article of claim 7 in which the polymeric composition includes polyvinyl chloride.

9. Article of claim 8 in which the said polymeric composition includes a crosslinking medium.

10. Article of claim 9 in which the crosslinking medium contains a difunctional monomer.

11. Article of claim 10 in which the difunctional monomer is of the type $CH_2C(CH_3)COO(CH_2)_xOCOC(CH_3)CH_2$ or $CH_2C(CH_3)COO(CH_2CH_2O)_y COC(CH_3)CH_2$ in which $x$ is an average value of from 3 to 40 and $y$ is an average value of from 1.5 to 20.

12. Article of claim 1 in which the said detector contains a photodimer of an anthracene derivative.

13. In a radiation detector designed for exposure to radiation environment, an active radiation-sensitive medium consisting essentially of a photodimer which, upon exposure to said radiation environment, dissociates at least partially to produce a monomeric species which fluoresces upon exposure to ultraviolet illumination.

14. Detector of claim 13 in which said photodimer is a photodimer of an anthracene derivative.

15. Process for fabrication of an article, processing of which includes exposure to a radiation environment, comprising shaping material to form a functional configuration and exposing the said shaped configuration to the said radiation environment, characterized in that a radiation detector consisting essentially of a photodimer is affixed to said article, in that the said photodimer dissociates, at least partially, to produce a monomer in said environment, and in that the said detector is subsequently illuminated by electromagnetic radiation, such illumination causing fluorescence of the said monomer thereby serving to monitor the presence or degree of irradiation in the said environment.

16. Process of claim 15 in which the said photodimer is a photodimer of an anthracene derivative.

* * * * *